United States Patent [19]
auBuchon et al.

[11] Patent Number: 5,806,301
[45] Date of Patent: Sep. 15, 1998

[54] RAMJET/SCRAMJET INLET ISOLATOR UNSTART PREVENTION

[75] Inventors: Mark D. auBuchon; Robert C. Caldwell, both of West Palm Beach; James T. Gill, III, Palm Beach Gardens, all of Fla.; Joseph P. Madden, Desplaines, Ill.

[73] Assignee: United Technologies Corporation, Hartford, Conn.

[21] Appl. No.: 570,391

[22] Filed: Dec. 11, 1995

[51] Int. Cl.[6] ...................................................... F02K 7/10
[52] U.S. Cl. ................... 60/204; 60/243; 137/15.2
[58] Field of Search ........................ 60/204, 233, 240, 60/243, 270.1; 137/15.1, 15.2

[56] References Cited

U.S. PATENT DOCUMENTS 3,181,818  5/1965  Pearl ............................................ 60/233
3,791,141  2/1974  Bush et al. .................................. 60/243
3,911,260  10/1975  Dustin ..................................... 137/15.2
4,277,940  7/1981  Harner et al. ............................. 60/243

*Primary Examiner*—Louis J. Casaregola
*Attorney, Agent, or Firm*—Robert E. Greenstien

[57] ABSTRACT

Pressure sensors are placed at axial locations in the isolator of a scramjet or ramjet. An engine fuel control produces calculated pressure values for the those locations from a stored function. As the engine operates, the pressure signals from the pressure sensors are compared with those pressure values for each sensor location and the stored function is adjusted so that the curve of the calculated pressures closely matches the measured pressures within stored upper and lower pressure limits for each pressure sensor location. From the adjusted function. the shock system is located. Fuel flow is controlled to maintain the shock system at a desired location in the isolator. Faulty pressure sensors are detected from a signal that manifests the difference between calculated and actual pressure at each pressure sensor.

13 Claims, 4 Drawing Sheets

RAMJET/SCRAMJET INLET ISOLATOR UNSTART PREVENTION

FIELD OF THE INVENTION

This invention relates to ramjets and scramjets, in particular, controlling the shock system location in the isolator on those jet engines.

BACKGROUND

Ramjet or scramjet propulsion systems that operate at supersonic and hypersonic Mach numbers generally have a constant area (or nearly constant area) section behind the throat of the internal or mixed compression inlet system to isolate the inlet from the combustion system. The "isolator", as this region is commonly called, is used to contain and entrap a pre-combustion shock system which, if allowed to move upstream of the inlet throat, would unstart the inlet and severely impact the performance and operability of the vehicle and the propulsion system.

The location or the pre-combustion shock system in the isolator is a function of the combustion back pressure and is an indicator of unstart margin. When the propulsion system thrust is higher, the shock system will be located farther upstream in the air flow because of the higher back pressure. Ideally, the shock system is positioned as far forward as possible while maintaining sufficient margin to prevent inlet unstart. Detection and control of the shock system is fundamental to achieving optimum propulsion system performance and avoiding inlet unstarts.

State of the art shock detection systems that use a static pressure array in the isolator are well known. One approach compares the sensed data to reference pressure values, i.e., design values. The sensed pressure for each probe in the array is compared to the "low back pressure" (supercritical) reference level for each sensor. A sensor reading above the reference pressure value for a sensor, is interpreted as a evidence that the shock system is forward of the coincident sensor. Various interpolation and estimation schemes are often included to predict the position of the shock system between sensors. This may be necessary to minimize the number of sensors required and increase the fidelity of the shock locating system.

An undesirable aspect of this prior art is that the fidelity of the system is dependent on the accuracy of the reference pressure values. To maintain high accuracy, the reference pressures may have to be modified as a function of flight conditions, inlet geometry and vehicle angle of attack and yaw. In addition, normal sensor noise and the signal perturbation caused by the shocks traversing a pressure sensor probe in the isolator also result in inaccurate shock location estimations.

Other prior art shock control systems attempt to control the position of the shock system by scheduling of the engine (or isolator) pressure ratio to an empirically defined value. These systems also suffer from sensitivity to sensor noise and reference value uncertainties. Not surprisingly, these approaches require significant margins for error or relatively complex compensation to accommodate changes in flight conditions and vehicle attitude (angle of attack and yaw).

Generally speaking, the weakness with prior art techniques lies in their reliance on specific values for reference values and limits. Successful detection and control of the shock system with these systems requires a significant empirical data base and/or high fidelity isolator simulations for the selected references and limits to be valid for the specific engine application. In a sense, these techniques are not robust enough because unexpected or unknown phenomena or deficiencies can not be easily detected and accommodated. As a result, the shock system may not be optimally located, a situation that could either unstart the inlet, if the shock system is to close to the inlet opening, or reduce engine efficiency, if the shock system is too far back from the inlet opening.

DISCLOSURE OF THE INVENTION

An object of the present invention to provide a technique for determining and controlling the location of the shock system.

According to the invention, the axial pressure distribution in the isolator is measures by a plurality of pressure sensors. The measured pressures are used to generate a pressure distribution curve along the isolator axial axis as the engine operates. From this curve, the shock location is determined and engine combustion is adjusted to maintain the shock system at that location.

According to the present invention, a normalized function F(x) is used to define a calculated pressure (Pcalc) at each pressure sensor location. The function is the expected pressure rise signature (curve shape) for the isolator and is defined by the following relationships.

$$[Pcalc]n = A \cdot F(Xn) + B, \text{ where,}$$
$$Xn' = C \cdot [\text{probe location}]n + D, \text{ and, therefore,}$$
$$[Pcalc]n = A \cdot f(C \cdot [\text{probe location}]n + D) + B \quad (1)$$

Using a least-squares fit curve fit algorithm, the coefficients in equation 1 are adjusted to "stretch" or "compress" the calculated curve to one that best matches the sensed pressures along the isolator (the least squares sum is at its minimum value). The shock system axial location is determined from the adjusted polynomial (the dynamic pressure distribution function of equation 1) and fuel flow is adjusted to place it at a preferred location.

According to one aspect of the present invention, the accuracy of the fit or match is manifested in a signal produced from the least squares fit and the magnitude of the signal is used to diagnose sensor operation. Differences between calculated pressure, using the new coefficients, and measured pressure for each sensor is also used to diagnose the operation of the pressure sensors.

A feature of the invention is that it provides a shock position detection system that is based on a pressure array signature, not absolute pressure levels. The invention does not require a prior definition of supercritical engine operating conditions and flight conditions, such as the effects of vehicle attitude (angle of attack an yaw).

Another feature is that the shock position detection system is inherently self-monitoring and generates output parameters whose values are indicative of the quality (confidence) of the shock estimation. These parameters can identify when an anomalous pressure signature exists and also has the potential to detect and accommodate in-range (soft) pressure failures in the isolator pressure array.

Other objects, benefits and features of the invention will be apparent from the following discussion of one or more embodiments.

BEST MODE FOR CARRYING OUT THE INVENTION

Figure 1:
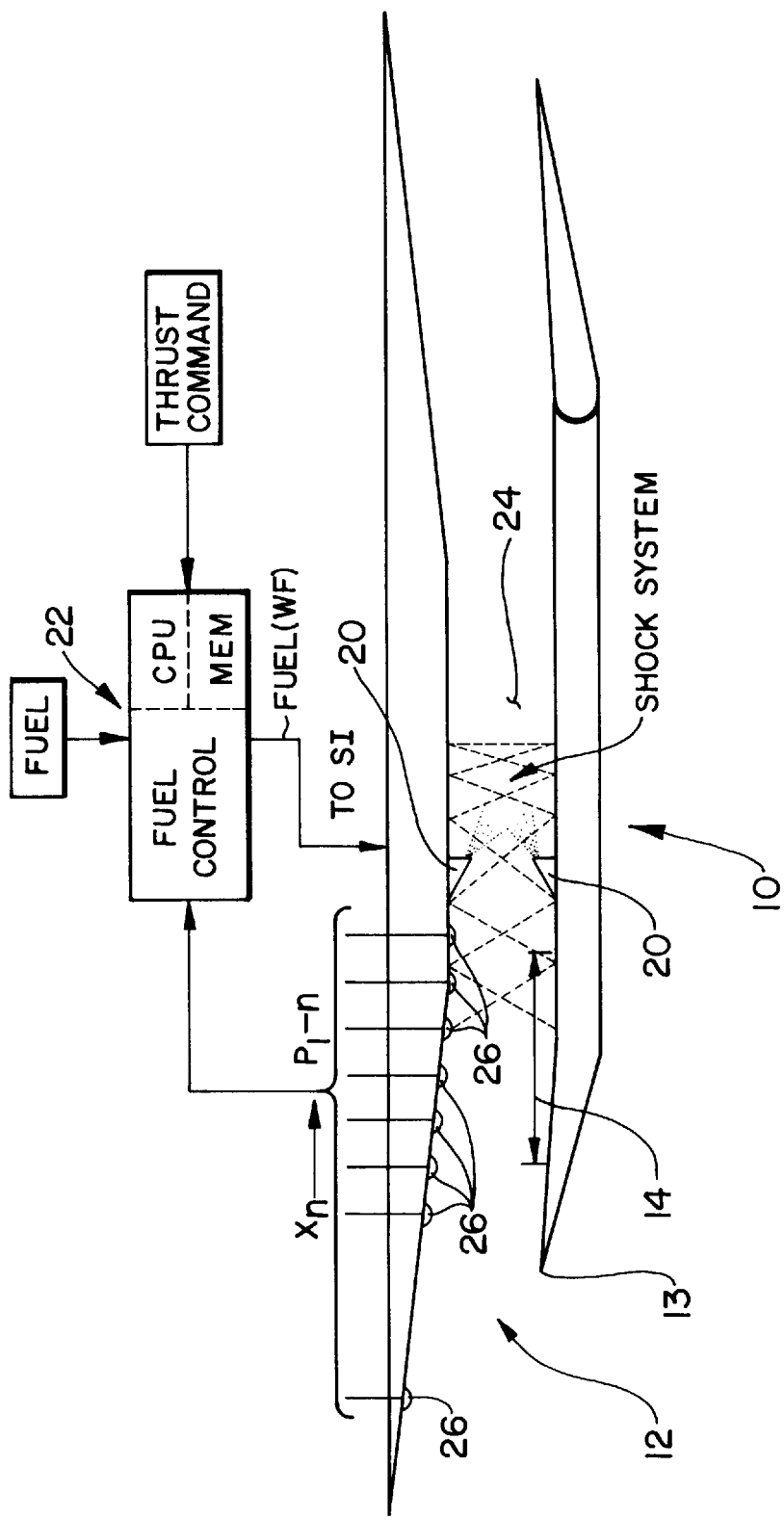
FIG. 1 is a schematic representation of a scramjet engine propulsion system with isolator pressure sensors and an electronic fuel control for controlling fuel flow to the engine according the present invention.

Referring to FIG. 1, a scramjet engine 10 has an air inlet 12 which connects with a downstream region called the "isolator" 14. Downstream within the isolator, scram fuel injectors 20 injector fuel from a computer based fuel control 22 into the airflow. Combustion of the fuel/air mixture takes place downstream from the injectors 20 in the region 24. The fuel control contains a signal processor CPU and a memory MEM for performing signal processing steps according to stored program instructions, stored in the Memory MEM, based on pressure signals $P_{1-n}$ from a plurality of pressure sensors 26. Each sensor provides an indication of pressure at an axial isolator location while the engine is operating. Using those pressures, the fuel control 22 determines the location of the shock system leading edge and adjusts the fuel flow WF to maintain it a particular location. This process is performed cyclically by the CPU as the engine operates.

Figure 2:
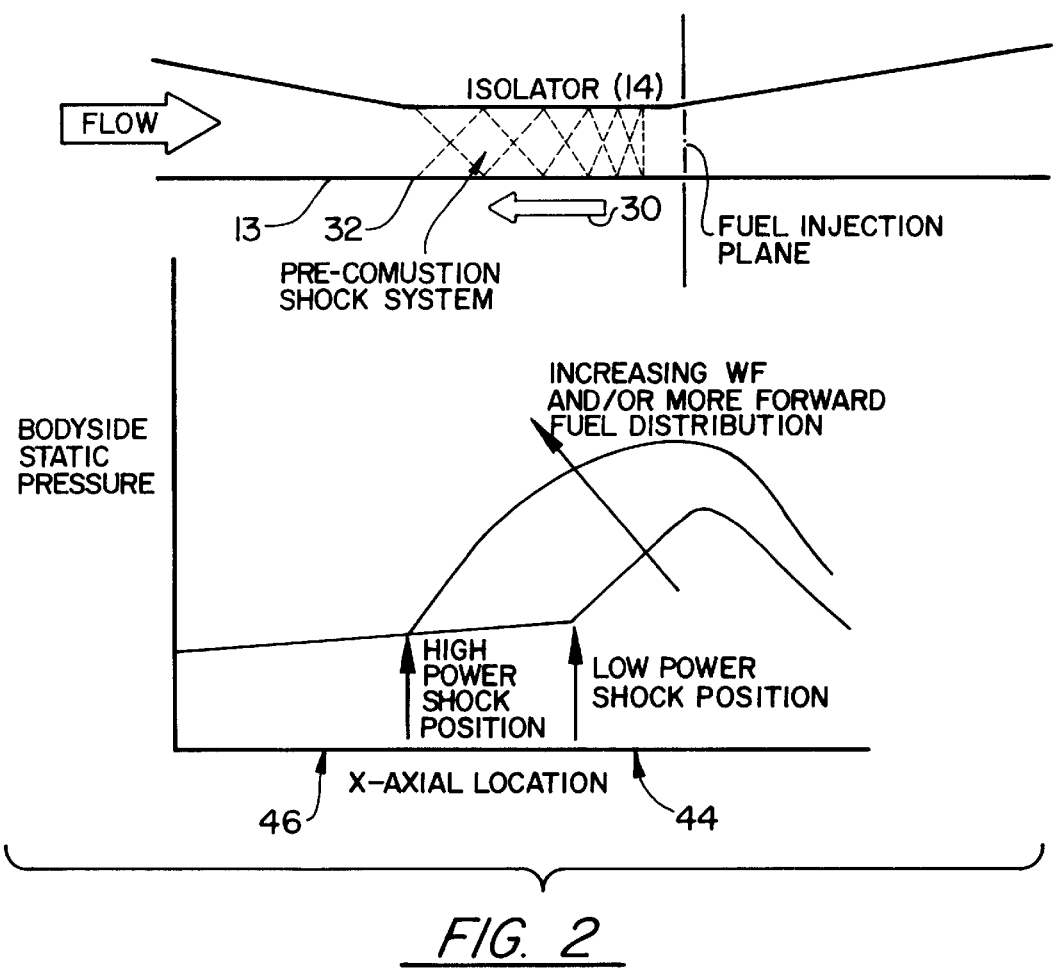
FIG. 2 is a illustration showing static pressure at different axial locations from the inlet through the isolator to the fuel injection plane as a function of fuel flow to the engine.

FIG. 2 functionally shows air flow through the isolator and the X-Y plot that is directly below shows the corresponding axial pressure rise downstream along the isolator under high and low power conditions. When engine power is increased, by injecting more fuel the location of the shock system moves upstream 30. However, the leading edge 32 of the shock system should not leave the isolator (go beyond inlet location 13) or the engine may unstart. The location of the shock system, and especially the leading edge 32, is a function of back pressure caused by fuel combustion. The present invention senses the pressures in the isolator to control fuel flow to the engine to maintain a proper location for that edge 32.

Figure 3:
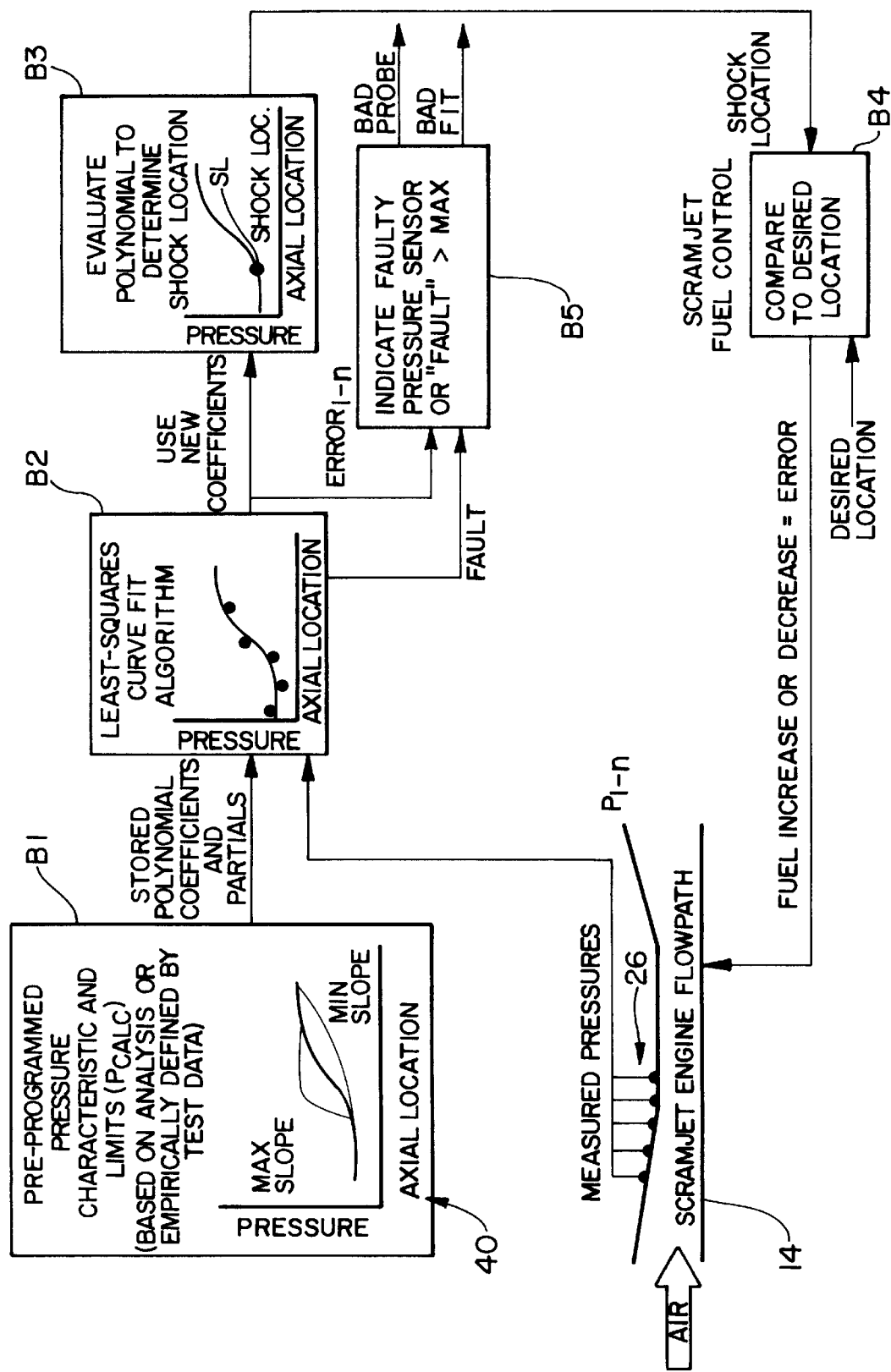
FIG. 3 is a block diagram showing signal processing steps and transfer functions employed by fuel control embodying the present invention.

FIG. 3 illustrates the signal processing steps or functions that are embodied by the invention and which are carried out by the CPU in the fuel control 22. Function block B1 contains pre-programmed normalized pressure distribution characteristics for the isolator in the form of the definition of the coefficients of the polynomial of equation 1 and mathematical information (partials for the curve fit routine). Stored in the memory MEM, the characteristics are based on engine design analysis or actually determined from experimental engine flights. The axial location vs. pressure graph 40, shown in block B1, illustrates an expected pressure distribution for the isolator 20. The curve 40 may be a blend of the minimum and maximum slope curves, as shown. The minimum and maximum slope curves 40 may be implemented by constraints on the values of the coefficients determined in block 2. The function at block B2 uses the known least square function of the following equation 2 to find the best fit (minimum NET ERROR) between actual pressures (sensed isolator pressure distribution) and the stored or calculated pressure values from block B2 for each sensor position $X_n$ from equation 1 by adjusting the coefficients and partials used in equation 1.

$$\text{NET ERROR} = \sum_{n=1}^{i} (\text{Sensed Pressure}_n - Pcalc)^2 \qquad (2)$$

Figure 4:
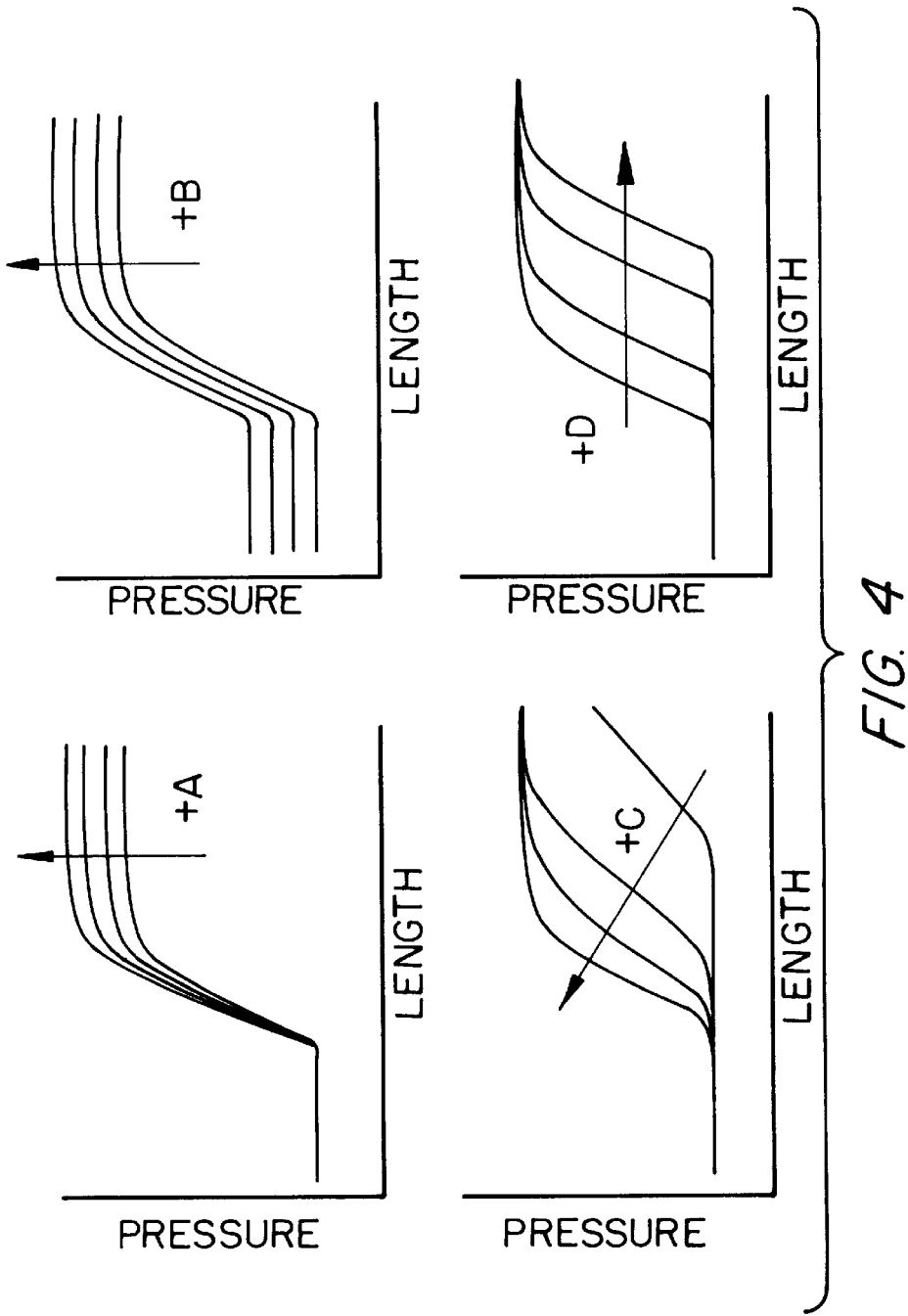
FIG. 4 demonstrates the effect of the coefficients on $Pcalc_n$

FIG. 4 demonstrates the stretching effects from changing the coefficients A,B,C and D. The fuel control CPU conducts the process in block B2 successively by adjusting the coefficient and producing the signal NET ERROR for each combination of A,B,C and D, the magnitude of that signal manifesting the accuracy of the fit or match between the calculated pressure distribution and the sensed or actual pressure distribution. Once the best fit is obtained (minimum NET ERROR), the new coefficients will be used in block B3. The individual PRESSURE ERROR signals or terms (Sensed Pressure$_n$- Pcalc$_n$ in equation 2) are also processed by a diagnostic function B5 to determine if a pressure sensor 26 is faulty. If the magnitude of the PRESSURE ERROR signal for that probe reaches a threshold stored in the memory MEM, a signal BAD PROBE is produced by the function at block B5. It should be appreciated that constraints on minimum and maximum values for the coefficients imposed in block B2 ensure that physically realizable characteristic curve is produced through the operation of block B2. However, the NET ERROR signal will manifest the adjustments that would have produced a fit but for the constraints, and If NET ERROR reaches a threshold stored in the memory MEM, a signal BAD FIT is produced, as shown by block B5. The new coefficients are processed according the function block B3 to determine the shock system location SL, specifically, the position of the leading edge 32, which is the point at which the pressure in the isolator begins to rise. The actual location is compared to the desired or preferred location ( e.g., the most forward location) by the function at block B4 to produce an ERROR signal which is used by the fuel control 22 to increase the fuel flow WF, if the actual shock location is too far downstream (for instance at 44 in FIG. 2) for the commanded engine thrust or decrease the flow, if the shock location is too far upstream (for instance at 46 in FIG. 2).

With the benefit of the previous discussion of the invention, one of ordinary skill in the art may be able to modify the invention in whole or in part without departing from the true scope and spirit of the invention.

We claim:

1. A jet engine having an isolator and a fuel control for controlling fuel flow to the combustion area, characterized by:

pressure sensing means for providing pressure signals manifesting pressure at each of a plurality of locations in the direction of air flow in said isolator; and the fuel control comprising signal processing means for producing a computed pressure value signal for a location along said direction of air flow from a first mathematical function defining an isolator pressure distribution in said direction of air flow; for storing and recalling said first mathematical function; for producing and storing a second mathematical function, for calculating the pressure value at said location, by adjusting said first mathematical function so that pressure values calculated from said second mathematical function provide a signature corresponding to a signature associated with said pressure signals; for producing, from said second mathematical function, a shock system location signal manifesting a location of a shock system in the isolator in said direction of air flow; for storing a desired location signal manifesting a desired location for a shock system in said direction of air flow; for producing, from said desired location signal and said shock location signal, an error signal manifesting the magnitude of distance between said location of a shock system and said desired location; and for controlling fuel flow to reduce said error signal.

2. The jet engine described in claim 1 further characterized in that said signal processing means comprises:

means for storing and performing a best fit mathematical process to adjust said first mathematical function so that a curve defined by said second mathematical function best fits a curve defined by said pressure signals.

3. The jet engine described in claim 2, further characterized in that said first mathematical function defines the pressure at a location using a plurality of coefficients; and said signal processing means comprises means for modifying said coefficients to produce said second mathematical function.

4. The jet engine described in claim 1, further characterized in that said first mathematical function defines the pressure at a location using a plurality of coefficients; and said signal processing means comprises means for modifying said coefficients to produce said second mathematical function.

5. The jet engine described in claim 1, further characterized in that said first mathematical function defines the pressure at a location using a plurality of coefficients as set forth in the following relationship $$[Pcalc]n = A.f(C.[\text{probe location}]n + D) + B$$

where $[Pcalc]n$ is a pressure calculated for a location n, $[\text{probe location}]n$ is the location of said pressure sensing means in said direction of air flow, and A, B, C and D are adjustable coefficients; and said signal processing means comprises means for modifying said coefficients to produce said second mathematical function.

6. The jet engine described in claim 1, further characterized in that said signal processing means comprises means for storing upper and lower limits in coefficients changed to adjust said first mathematical function.

7. The jet engine described in claim 1, further characterized in that said signal processing means comprises:

means for storing and performing a best fit mathematical process to adjust said second mathematical function so that a curve defined by said second mathematical function best fits a curve defined by said pressure signals; for limiting adjustment of said mathematical function based on stored parameters; for storing said parameters; for providing a fault signal that manifests that said best fit mathematical process is not within a limit; and for storing and recalling said limit.

8. A method of controlling the location of a shock system in a jet engine having an isolator and carried out cyclically by a signal processor according to program instructions characterized by:

storing a defined pressure distribution function for said isolator;

during engine operation, measuring pressures at locations along said isolator;

adjusting coefficients in said defined pressure distribution function to produce a dynamic pressure distribution function that maps pressure along said isolator in a pattern best matching a map of the pressures at said locations;

determining a shock system location from said dynamic distribution function; and adjusting fuel flow to the jet engine to place said shock system at a desired isolator location according to said dynamic distribution function.

9. The method described in claim 8, further characterized by:

performing diagnostics on isolator pressure measurement devices using a computed indication of a magnitude of difference between said defined pressure distribution function and said dynamic distribution function.

10. The method described in claim 8, further characterized by:

providing a diagnostic signal manifesting a magnitude of difference between said defined pressure distribution function and said dynamic pressure distribution function;

limiting adjustment of said coefficients after providing said diagnostic signal; and performing diagnostics on isolator pressure measurement devices using said diagnostic signal.

11. A jet engine having an isolator and a fuel control, characterized by:

means for sensing the actual pressure distribution in the isolator;

a signal processor comprising means, responsive to said means for sensing, for storing a predetermined pressure distribution for said isolator; for determining differences between said predetermined pressure distribution and said actual pressure distribution according to stored criteria; for providing a corrected predetermined pressure distribution by adjusting said predetermined pressure distribution to reduce said differences; for determining the operating location of a shock system in the isolator from a function defining said corrected pressure distribution; for storing a desired location for said shock system in the isolator; and for providing a signal to the fuel control to change fuel flow to the jet engine to move said operating location to said desired location.

12. The jet engine described in claim 11, further characterized by said signal processor further comprising:

means for providing a signal with a magnitude manifesting said differences and for determining a fault in said actual pressure distribution from said differences.

13. The jet engine described in claim 11, further characterized by said signal processing means comprising:

means for limiting an adjustment of said predetermined pressure distribution so that pressures for isolator locations on said corrected pressure distributions fall within predetermined upper and lower pressure limits.

* * * * *